*United States Patent* [19]

Nawa et al.

[11] Patent Number: 5,583,714
[45] Date of Patent: Dec. 10, 1996

[54] TAPE LOADING MECHANISM WITH REDUCED HEIGHT

[75] Inventors: Ikuichiro Nawa; Koichi Shimoyama; Masafumi Ishizuki; Keiichi Setsumasa, all of Atsugi, Japan

[73] Assignee: Mitsumi Electric Co., Ltd., Tokyo, Japan

[21] Appl. No.: 384,766

[22] Filed: Feb. 7, 1995

[30] Foreign Application Priority Data

Feb. 8, 1994 [JP] Japan .................................. 6-014522

[51] Int. Cl.⁶ .................................................. G11B 15/665
[52] U.S. Cl. .............................................. 360/85; 360/95
[58] Field of Search .......................... 360/85, 95, 130.22, 360/130.23; 242/346.1

[56] References Cited

U.S. PATENT DOCUMENTS

| | | | |
|---|---|---|---|
| 4,903,878 | 2/1990 | Usami et al. | 226/190 |
| 5,021,899 | 6/1991 | Kotoda | 360/85 |
| 5,041,928 | 8/1991 | Sasaki et al. | 360/85 |
| 5,349,485 | 9/1994 | Lin et al. | 360/85 |
| 5,365,386 | 11/1994 | Konishi et al. | 360/85 |
| 5,417,097 | 5/1995 | Kojima et al. | 72/335 |
| 5,430,585 | 7/1995 | Takada et al. | 360/85 |

*Primary Examiner*—Robert S. Tupper
*Assistant Examiner*—William R. Korzuch
*Attorney, Agent, or Firm*—Michael N. Meller

[57] ABSTRACT

A tape loading mechanism includes: a chassis having a guide groove; a loading post assembly having a loading post and a loading post base, the loading post base being movably supported on the chassis and being movable along the guide groove, the loading post being supported on the loading post base and loading a tape onto a tape path of a rotating drum when the loading post base is moved to a loading end position; a projecting portion, projecting from an end of the loading post base in a direction of the movement of the loading post base, which is brought into contact with a drum base of the rotating drum when the loading post base is moved to the loading end position; and a stopper portion, provided within the drum base, for catching the projecting portion to stop the movement of the loading post base at the loading end position.

3 Claims, 7 Drawing Sheets

TAPE LOADING MECHANISM WITH REDUCED HEIGHT

BACKGROUND OF THE INVENTION (1) Field of the Invention

The present invention generally relates to a tape loading mechanism, and more particularly to a tape loading mechanism for use in a digital audio tape recorder, which realizes a reduction of the total height thereof by using a simple structure.

(2) Description of the Prior Art

Figure 1:
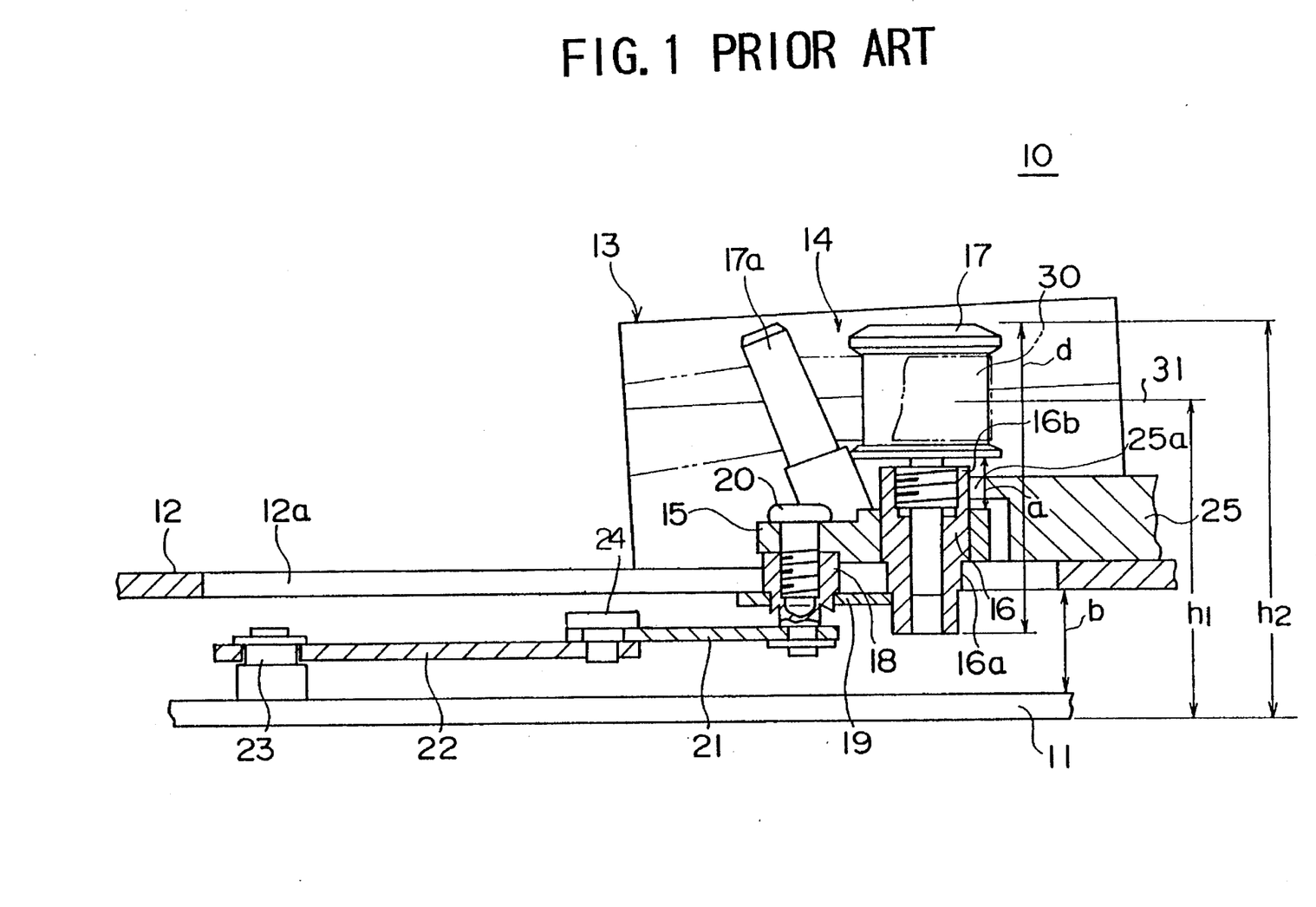
FIG. 1 is a cross-sectional view of a conventional tape loading mechanism.
Figure 2:
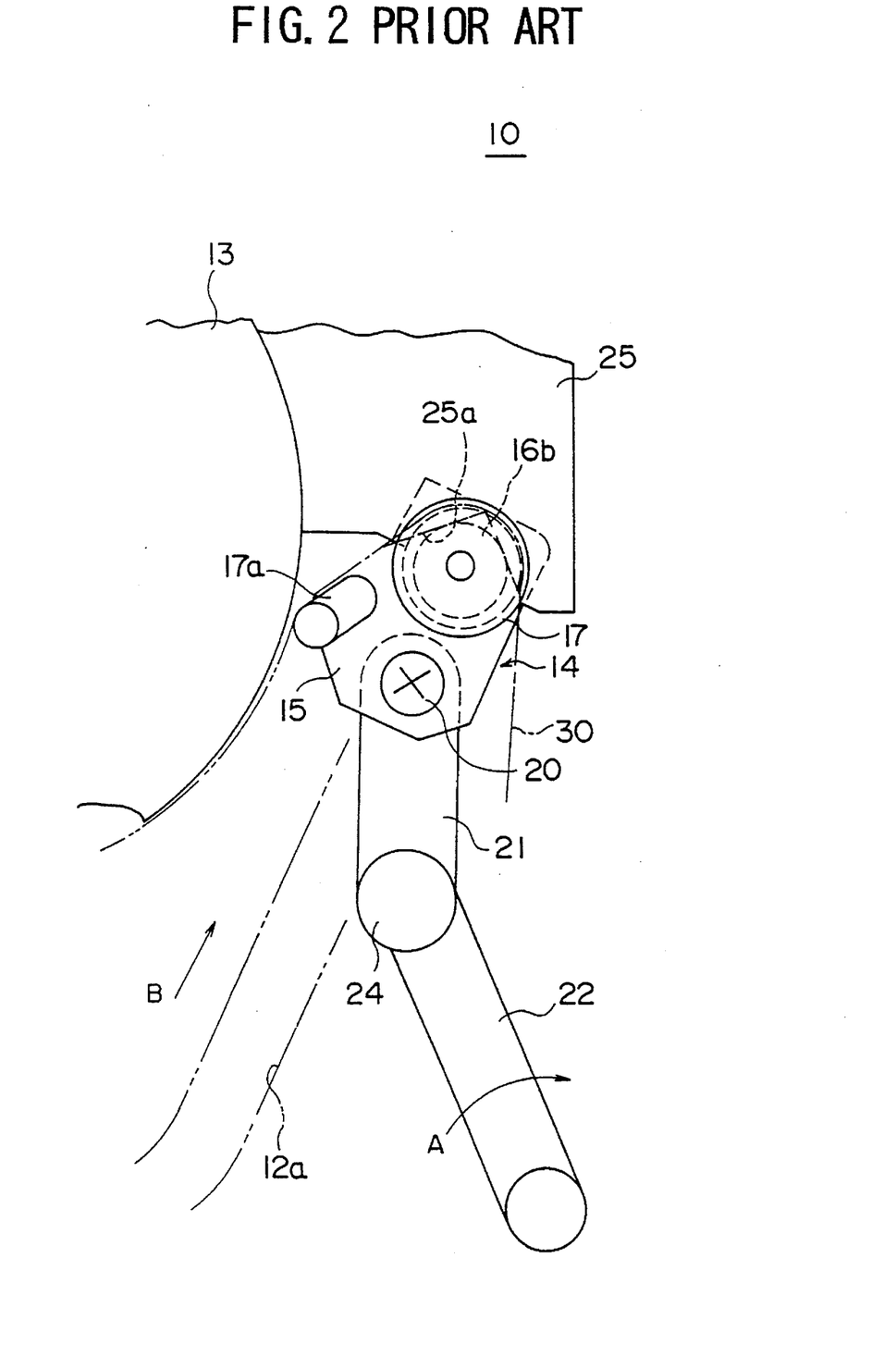
FIG. 2 is a plan view of the conventional tape loading mechanism in FIG. 1.

FIGS. 1 and 2 show a conventional tape loading mechanism 10 for use in a rotary head type digital audio tape recorder (R-DAT). The tape loading mechanism 10 includes a main chassis 11, a sub-chassis 12, a rotating drum 13, and a loading post assembly 14.

The loading post assembly 14 includes a base 15, a supporting member 16, a loading post 17, a slanting post 17a, a guide pin 18, a retaining plate 19, and a screw 20. The supporting member 16 is secured to the base 15 and passed through it. The supporting member 16 includes a guide pin portion 16a downwardly projecting from the base 15 and a contact portion 16b upwardly projecting toward the loading post 17.

The loading post 17 is arranged on the supporting member 16. The guide pin 18 is attached to the base 15 by fitting the screw 20 into the base 15. The retaining plate 19 is staked to the guide pin 18 so as to prevent the lifting of the loading post assembly 14 from the sub-chassis 12.

The guide pin portion 16a and the guide pin 18 are fitted onto a guide groove 12a of the sub-chassis 12. Thus, the loading post assembly 14 is slidable on the sub-chassis 12 along the line of the guide groove 12a.

A first loading arm 21 has one end connected to the bottom end of the guide pin 18. A second loading arm 22 has one end rotatably supported by a pin 23 of the main chassis 11. A connecting pin 24 is staked to the other end of the first loading arm 21. The first loading arm 21 and the second loading arm 22 are linked to each other by the connecting pin 24.

A drum base 25 is threaded on the sub-chassis 12. The drum base 25 has a stopper portion 25a which is cut into a V shape.

As shown in FIG. 2, when the second loading arm 22 is rotated by a drive unit (not shown) in a direction indicated by the arrow A, the loading post assembly 14 is pushed by the first loading arm 21 so that the loading post assembly 14 is moved along the guide groove 12 in a direction indicated by the arrow B.

When the contact portion 16b comes into contact with the stopper portion 25a of the drum base 25 due to the movement of the loading post assembly 14, the loading post assembly 14 is in its loading end position.

A tape cassette (not shown) is inserted in the digital audio tape recorder, and a magnetic tape 30 is taken out from the tape cassette by the loading post 17. The magnetic tape 30 from the tape cassette is loaded by the loading post 17 onto a tape path on the rotating drum 13.

In the tape loading mechanism 10 described above, the stopper portion 25a has to be inserted between the base 15 and the loading post 17. Thus, it is necessary to allow for a certain distance from the base 15 to the loading post 17 within the tape loading mechanism 10. Accordingly, the distance from the base 15 to the loading post 17, indicated by "a" in FIG. 1, is relatively great, which increases the height of the loading post assembly 14 within the tape loading mechanism 10 to a height indicated by "d" in FIG. 1.

In the tape loading mechanism 10 described above, the retaining plate 19 and the first loading arm 21 overlap, and the first loading arm 21 and the second loading arm 22 further overlap. Thus, it is necessary to allow for a relatively great distance between the main chassis 11 and the sub-chassis 12, which is greater than the sum of thicknesses of the retaining plate 19, the first loading arm 21 and the second loading arm 22. Accordingly, the distance between the main chassis 11 and the sub-chassis 12, indicated by "b" in FIG. 1, is relatively great.

For the reasons described above, the distance from the main chassis 11 to a center line 31 of the magnetic tape 30 of the loading post 17, indicated by "h1" in FIG. 1, is relatively great, which increases the total height of the tape loading mechanism 10 to a height indicated by "h2" in FIG. 1. As the conventional tape loading mechanism has to allow for relatively great dimensions as described above, it is difficult to realize a reduction of the total height of the tape loading mechanism.

SUMMARY OF THE INVENTION

Accordingly, it is a general object of the present invention to provide an improved tape loading mechanism in which the above-described problem is eliminated.

Another, more specific object of the present invention is to provide a tape loading mechanism which realizes a reduction of the total height thereof by using a simple structure.

Still another object of the present invention is to provide a tape loading mechanism in which the total number of required component parts is reduced so that the cost of manufacturing is reduced.

The above-mentioned object of the present invention is achieved by a tape loading mechanism which includes: a chassis having a guide groove; a loading post assembly having a loading post and a loading post base, the loading post base being movably supported on the chassis and being movable along the guide groove, the loading post being supported on the loading post base and loading a tape onto a tape path of a rotating drum when the loading post base is moved to a loading end position; a projecting portion, projecting from an end of the loading post base in a direction of the movement of the loading post base, which is brought into contact with a drum base of the rotating drum when the loading post base is moved to the loading end position; and a stopper portion, provided within the drum base, for catching the projecting portion to stop the movement of the loading post base at the loading end position.

According to the present invention, the height of the loading post assembly within the tape loading mechanism is remarkably reduced by using a simple structure which allows the total height of the tape loading mechanism to be reduced. In the tape loading mechanism according to the present invention, the retaining plate and the connecting pin, required by the conventional mechanism, need not be included between the main chassis and the sub-chassis. Thus, the total number of component parts required for the tape loading mechanism is reduced, so that the cost of manufacturing is reduced.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENT

A description will now be given of a tape loading mechanism in a preferred embodiment of the present invention.

Figure 3:
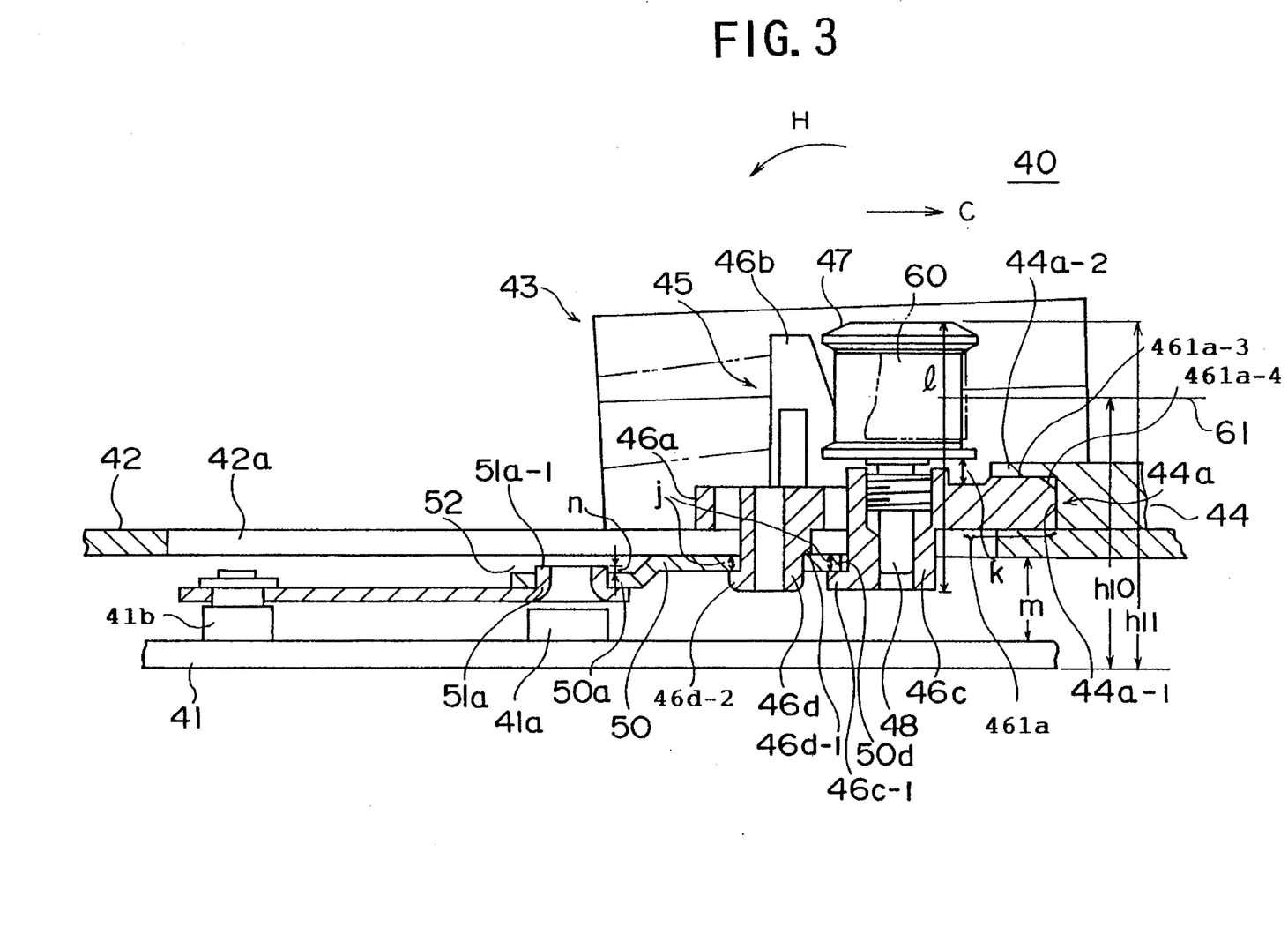
FIG. 3 is a cross-sectional view of a tape loading mechanism in a preferred embodiment of the present invention.
Figure 4:
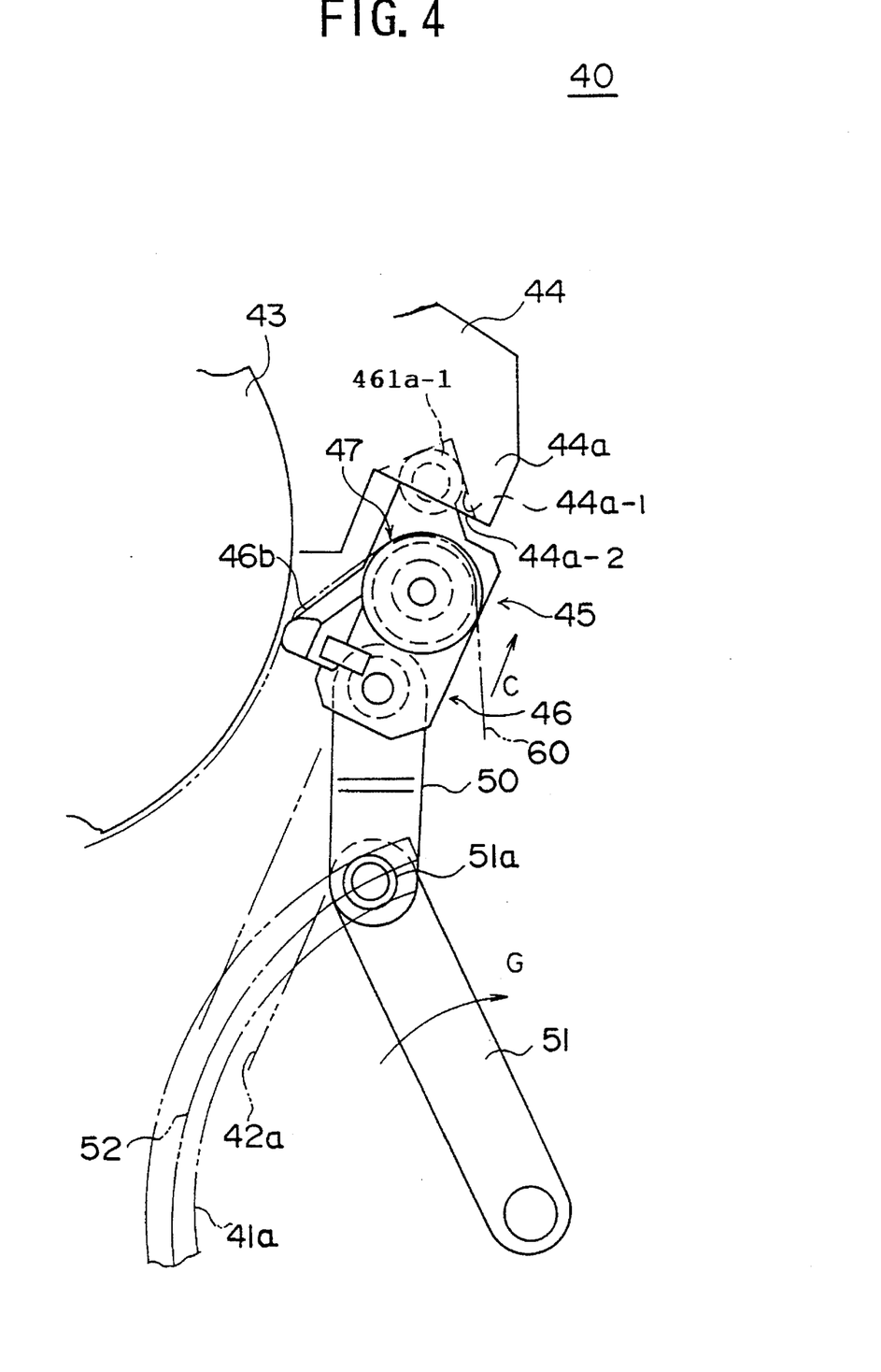
FIG. 4 is a plan view of the tape loading mechanism in FIG. 3.

FIGS. 3 and 4 show a tape loading mechanism 40 in the preferred embodiment of the present invention. This tape loading mechanism is applied to a rotary head type digital audio tape recorder (R-DAT).

The tape loading mechanism 40 includes a main chassis 41, a sub-chassis 42, a rotating drum 43, a drum base 44, and a loading post assembly 45. The drum base 44 is arranged on the sub-chassis 42.

Figure 5:
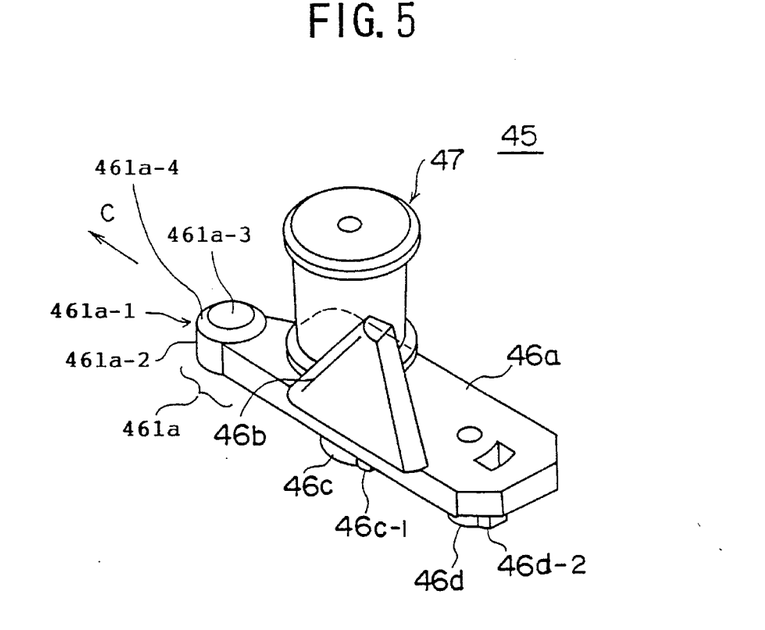
FIG. 5 is a perspective view of a loading post assembly of the tape loading mechanism in FIG. 3.
Figure 6:
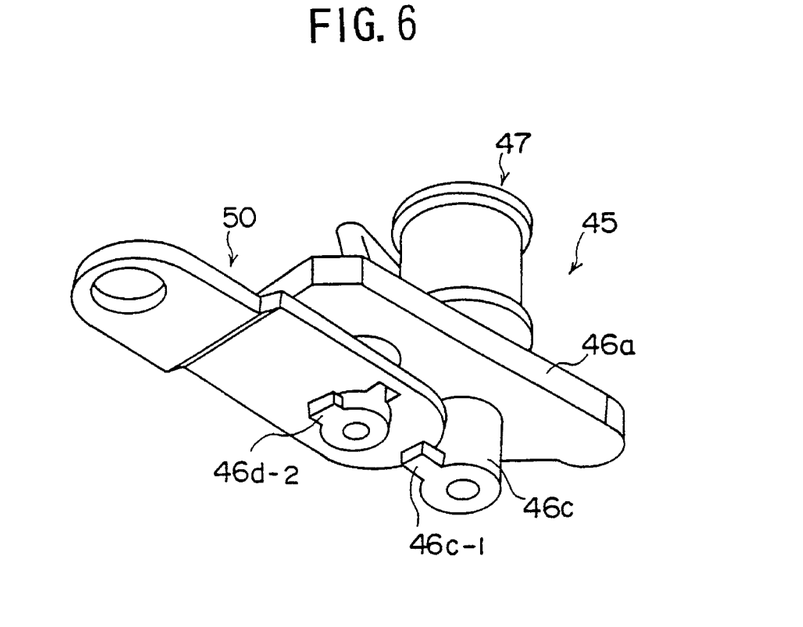
FIG. 6 is a perspective view of a first loading arm attached to a loading post assembly in FIG. 5.
Figure 7:
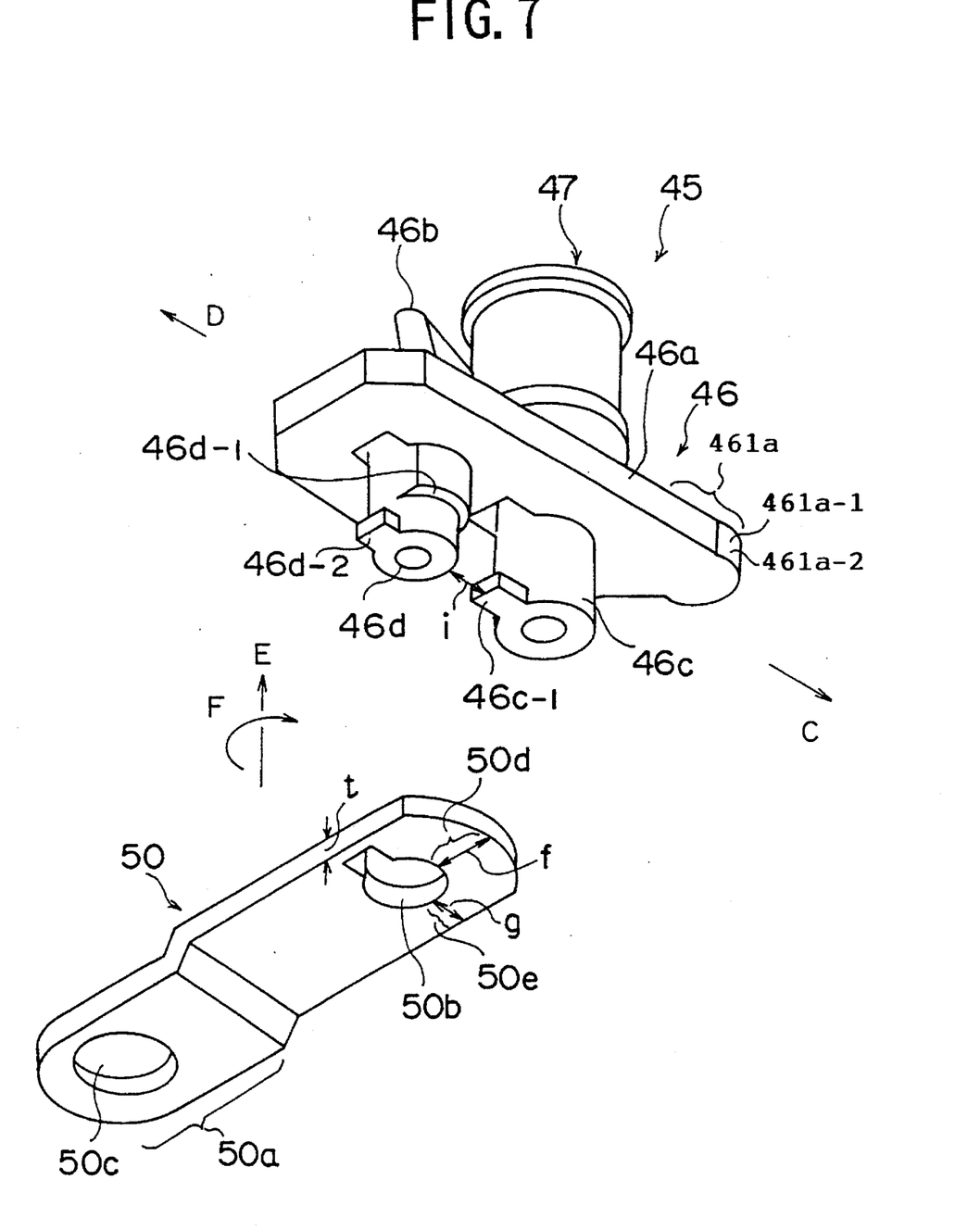
FIG. 7 is a perspective view of the loading post assembly and the first loading arm for explaining how they are assembled.

FIGS. 5 through 7 show the loading post assembly 45. The loading post assembly 45 includes a loading post base 46 and a loading post 47 on the loading post base 46.

The loading post base 46 is made of synthetic resin. The loading post base 46 includes a generally-rectangular base body 46a, a triangular tape guide member 46b, and two guide pins 46c and 46d. The tape guide member 46b extends upwardly from one side of the top of the base body 46a. The guide pins 46c and 46d extend downwardly from the bottom of the base body 46a and are separately arranged along a longitudinal line of the base body 46a.

The loading post 47 has a threaded shaft 48. A threaded portion of the threaded shaft 48 is press fitted to a top portion of the guide pin 46c, and the loading post 47 is attached to the loading post base 46 via the threaded shaft 48.

The base body 46a has a projecting portion 461a. The projecting portion 461a projects from the loading post 47 in a direction (indicated by an arrow C in FIG. 3) of movement of the loading post assembly 45 when a magnetic tape is loaded. The projecting portion 461a has at its leading edge a cylindrical head 461a–1. The cylindrical head 461a–1 includes a circular end face 461a–2, a raised top surface 461a–3, and a tapered edge 461a–4 of the raised top surface at the leading edge. As shown in FIG. 3, the raised top surface 461a–3 of the projecting portion 461a is slightly raised from the top surface of the base body 46a.

As shown in FIG. 7, the guide pin 46c is formed with a rectangular rib 46c–1 which laterally extends from the bottom end of the guide pin 46c in a direction (indicated by an arrow D in FIG. 7) opposite to the above direction of the movement of the loading post assembly 45 indicated by the arrow C in FIG. 3.

As shown in FIG. 7, a stepped portion 46d–1 is formed at an intermediate portion of the guide pin 46d, and the guide pin 46d is formed with a rectangular rib 46d–2 which laterally extends from the bottom end of the guide pin 46d in the direction indicated by the arrow D in FIG. 7.

The tape loading mechanism 40, as shown in FIG. 3, includes a first loading arm 50 having one end connected to the guide pin 46d, and a second loading arm 51 having one end connected to the other end of the first loading arm 50.

The first loading arm 50 includes a shoulder at an intermediate portion thereof, and a lower surface 50a below the intermediate shoulder. The first loading arm 50 further includes a hole 50b with a rib slot at one end, and a circular hole 50c at the other end. The hole 50b is formed into a shape equivalent to that of the guide pin 46d with the rib 46d–2 to allow the guide pin 46d with the rib 46d–2 to be snugly fitted in the hole 50b.

The first loading arm 50 has an end portion 50d and a side portion 50e which are located around the hole 50b. The hole 50b is formed in an upper surface of the first loading arm 50 above the intermediate shoulder, and a location of the hole 50b in the upper surface is determined such that a width (indicated by an arrow f in FIG. 7) of the end portion 50d is greater than a width (indicated by an arrow g in FIG. 7) of the side portion 50e.

A distance (indicated by an arrow i in FIG. 7) between the guide pin 46d and the rib 46c–1 is determined such that the distance "i" is greater than the width "g" of the side portion 50e and smaller than the width "f" of the end portion 50d.

Figure 8:
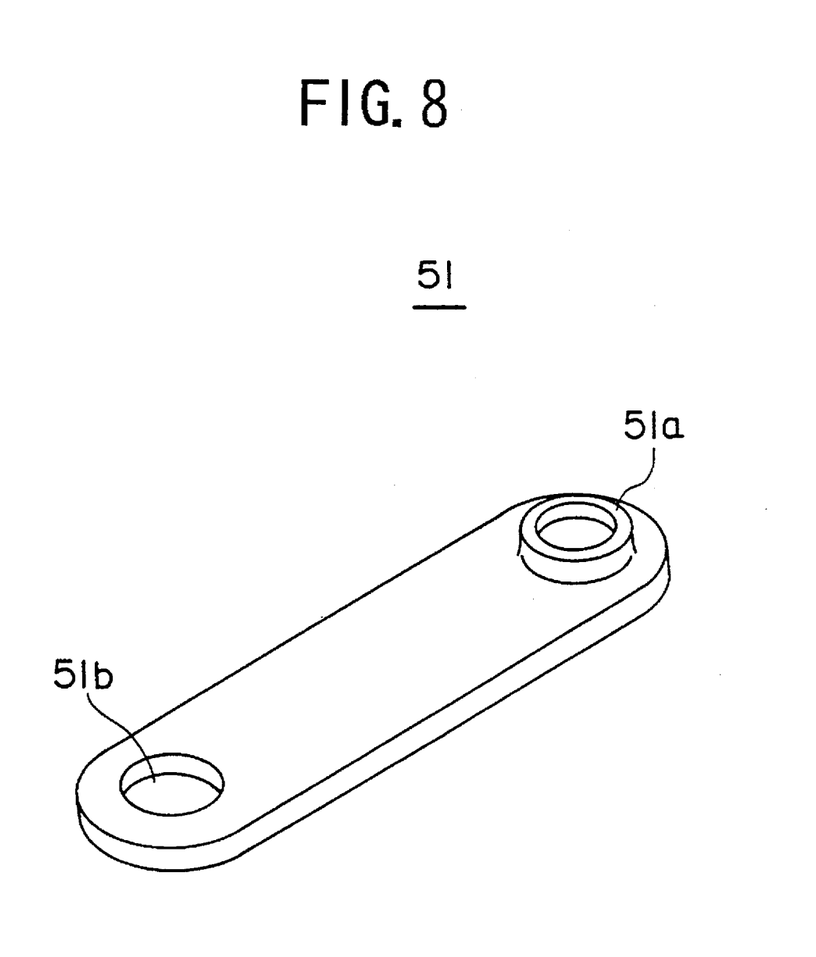
FIG. 8 is a perspective view of a second loading arm of the tape loading mechanism in FIG. 3.

FIG. 8 shows the second loading arm 51 of the tape loading mechanism 40 in FIG. 3. In FIG. 8, the second loading arm 51 includes a flanged portion 51a at one end, and a circular hole 51b at the other end. The flanged portion 51a is formed through burring (a kind of stretch flanging) or, alternatively hole expanding may be used.

As shown in FIGS. 3 and 4, a guide groove 42a is formed in the sub-chassis 42, and the loading post assembly 45 is slidable on the sub-chassis 42 along the line of the guide groove 42a. A raised portion 41a on the main chassis 41 is arranged along a trace line 52 of the movement of the flanged portion 51a during the tape loading action of the loading post assembly 45. In addition, a pin 41b is arranged on the main chassis 41, the pin 41b being fitted into the hole 51b of the second loading arm 51. Thus, the second loading arm 51 is rotatable around the pin 41b on the main chassis 41, As shown in FIGS. 3 and 4, the drum base 44 includes a stopper 44a which catches and holds the cylindrical head 461a–1 extending from the end of the loading post assembly 45, to stop the movement of the loading post base 46 at the loading end position. The stopper 44a includes a V-cut portion 44a–1 and an extended portion 44a–2.

Next, a description will be given of a general construction of the above tape loading mechanism 40.

The loading post assembly 45 is arranged on the sub-chassis 42, and the guide pins 46c and 46d are fitted in the guide groove 42a as shown in FIGS. 3 and 4. Thus, the loading post assembly 45 is slidable on the sub-chassis 42 along the line of the guide groove 42a.

The guide pins 46c and 46d are passed through the sub-chassis 42 to downwardly extend from the bottom of the sub-chassis 42. Both a distance (indicated by an arrow j in FIG. 3) between the rib 46c–1 and the bottom of the sub-chassis 42 and a distance (indicated by the arrow j in FIG. 3) between the rib 46d–2 and the bottom of the sub-chassis 42 are equivalent to a thickness (indicated by an arrow t in FIG. 7) of the first loading arm 50.

The hole 50b of the first loading arm 50 is fitted on the guide pin 46d, and one end of the first loading arm 50 is connected to the loading post assembly 45, as shown in FIG. 6. The first loading arm 50 in the position shown in FIG. 7 can be easily attached to the loading post assembly 45 by fitting the hole 50b onto the guide pin 46d toward the direction indicated by an arrow E in FIG. 7 and turning the first loading arm 50 around the central axis of the guide pin 46d about 90 degrees in the rotating direction indicated by an arrow F in FIG. 7.

In the embodiment described above, as shown in FIG. 3, after assembly the first loading arm 50 is held between the stepped portion 46d–1 and the rib 46d–2.

The upper surface of the first loading arm 50 is, as shown in FIG. 3, brought into contact with the bottom of the sub-chassis 42. In the embodiment described above, after assembly the sub-chassis 42 is held between the base body 46a and the first loading arm 50.

The end portion 50d of the first loading arm 50 is, as shown in FIG. 3, held between the sub-chassis 42 and the rib 46c–1 of the guide pin 46c.

As described above, the pin 41b on the main chassis 41 is fitted into the hole 51b of the second loading arm 51, and the flanged portion 51a is supported by the raised portion 41a. The second loading arm 51 is thus arranged on the main chassis 41.

The second loading arm 51 is brought into contact with the lower surface 50a of the first loading arm 50, and the flanged portion 51a is fitted into the hole 50c. The first loading arm 50 and the second loading arm 51 are thus linked to each other.

The horizontal position of the second loading arm 51 is retained by the raised portion 41a. Separation of the flanged portion 51a from the hole 50c is prevented by the raised portion 41a. The connection of the first loading arm 50 to the second loading arm 51 is thus safely maintained.

It is necessary that a space 52, as shown in FIG. 3, be provided between the sub-chassis 42 and the first loading arm 50. The flanged portion 51a is passed through the hole 50c, and a portion 51a–1 of the flanged portion 51a, upwardly projecting from the first loading arm 50, is included within the space 52. There must be no interference between the flanged portion 51a and the sub-chassis 42.

Next, a description will be given of a tape loading operation of the tape loading mechanism 40.

In FIG. 4, when the second loading arm 51 is rotated by a drive unit (not shown) in the direction indicated by the arrow G, the loading post assembly 45 is pushed by the first loading arm 50 so that the loading post assembly 45 is moved along the guide groove 42a in the direction indicated by the arrow C. A magnetic tape 60 from a tape cassette (not shown), inserted in the digital audio tape recorder, is drawn out by the loading post 47 at this time.

When the cylindrical head 461a–1 of the projecting portion 461a is brought into contact with the stopper 44a of the drum base 44 by the movement of the loading post assembly 45, the loading post assembly 45 is in its loading end position. The tapered edge 461a–4 serves to smoothly guide the cylindrical head 461a–1 so that the cylindrical head 461a–1 is inserted into the stopper 44a.

When the loading post assembly 45 is at the loading end position, the circular end face 461a–2 of the cylindrical head 461a is caught by the V-cut portion 44a–1, and the raised top surface 461a–3 is held by the extended portion 44a–2.

The magnetic tape 60 from the tape cassette is loaded by the loading post 47 on a tape path on the rotating drum 43.

Next, a description will be given of a construction of the tape loading mechanism 40 to prevent the lifting of the loading post assembly 45.

A force of the magnetic tape 60 acts on the loading post 47 during the tape loading operation, and a moment is applied to the loading post assembly 45 in a direction indicated by an arrow H in FIG. 3. This moment serves to lift the loading post assembly 45 from the sub-chassis 42.

In the embodiment described above, as shown in FIG. 3, the upper half of the first loading arm 50 comes into contact with the sub-chassis 42, and the end portion 50d of the first loading arm 50 is held between the sub-chassis 42 and the rib 46c–1. The lifting of the loading post assembly 45 from the sub-chassis 42 during the tape loading operation is safely prevented by this construction of the tape loading mechanism 40.

In addition, in the embodiment described above, as shown in FIG. 3, when the loading post assembly 45 is in the loading end position, the circular end face 461a–2 of the cylindrical head 461a is caught by the V-cut portion 44a–1, and the raised top surface 461a–3 is held by the extended portion 44a–2. The lifting of the loading post assembly 45 after the tape loading operation is safely prevented by this construction of the tape loading mechanism 40.

Next, a description will be given of constructions of the tape loading mechanism 40 which enable the total height of the mechanism 40 to be reduced.

(i) Construction Related to Projecting Portion 461a

The distance "a" from the base 15 to the loading post 17 in the conventional tape loading mechanism 10 in FIG. 1 is relatively great, which increases the height of the loading post 17 within the tape loading mechanism 10 to that indicated by the arrow "d" in FIG. 1.

In the embodiment described above, the projecting portion 461a of the loading post assembly 45, forwardly projecting from the loading post 47, is contained in or received by the drum base 44. It is not necessary to include any stopper portion between the base body 46a and the loading post 47. Thus, the dimension from the base body 46a to the loading post 47 in the tape loading mechanism 40, indicated by "k" in FIG. 3, is much smaller than the distance "a" in the conventional tape loading mechanism 10 in FIG. 1. Accordingly, the height of the loading post 47 in the embodiment described above, indicated by "l" in FIG. 3, is much smaller than the height "d" of the loading post 17 in FIG. 1.

(ii) Construction Related to First Loading Arm 50

In the conventional tape loading mechanism 10 in FIG. 1, the retaining plate 19 has to be provided to prevent the lifting of the loading post assembly 14 from the sub-chassis 12. The distance between the main chassis 11 and the sub-chassis 12, indicated by "b" in FIG. 1, is relatively great because of the thickness of the retaining plate 19.

In the embodiment described above, the first loading arm 50 with the end portion 50d secured by the rib 46c–1 of the guide pin 46c, serves to prevent the lifting of the loading post assembly 45 from the sub-chassis 42. As no retaining plate is needed for the tape loading mechanism 40 in FIG. 3, the distance between the main chassis 41 and the sub-chassis 42, indicated by "m" in FIG. 3, is much smaller than the distance "b" shown in FIG. 1.

(iii) Construction Connecting First Loading Arm 50 and Second Loading Arm 51

In the conventional tape loading mechanism 10 in FIG. 1, the connecting pin 24 is arranged so that the first loading arm 21 is linked to the second loading arm 22. The connecting pin 24 has a head 24a, and this head has a certain dimension indicated by "c" in FIG. 1.

In the embodiment described above, the flanged portion 51a of the second loading arm 51 is fitted into the hole 50c of the first loading arm 50 to connect the first loading arm 50 and the second loading arm 51. The projecting portion 51a–1 projects upward from the first loading arm 50, indicated by "n" in FIG. 3, by a distance much smaller than the dimension "c" in FIG. 1.

Because of the constructions (i) through (iii) described above, the height from the main chassis 41 to the center line 61 of the magnetic tape 60 on the loading post 47, indicated by "h10" in FIG. 3, is much smaller than the height "h1" in the conventional tape loading mechanism 10 in FIG. 1. This makes the total height of the tape loading mechanism 40, indicated by "h11" in FIG. 3, smaller than the total height "h2" of the tape loading mechanism 10.

The tape loading mechanism according to the present invention allows the total height of a digital audio tape recorder to be remarkably less than the total height of a conventional digital audio tape recorder.

The total number of parts of the tape loading mechanism according to the present invention is less than the total number of parts of the conventional tape loading mechanism, thus allowing the cost of manufacturing to be lower.

In the actual digital audio tape recorder, one tape loading mechanism is arranged on each side of the rotating drum 43, and the magnetic tape 60 is wound on the rotating drum 43 about 90 degrees.

In addition, the tape loading mechanism of the present invention may be applied to not only digital audio tape recorders but also video tape recorders.

Further, the present invention is not limited to the above-described embodiment, and variations and modifications may be made without departing from the scope of the present invention.

What is claimed is:

1. A tape loading mechanism comprising:

a chassis having a guide groove;

a loading post assembly having a loading post and a loading post base, said loading post base being movably supported on the chassis and being movable along the guide groove, said loading post being supported on said loading post base and loading a tape onto a tape path of a rotating drum when the loading post base is moved to a loading end position;

projecting means, projecting from an end of said loading post base in a direction of the movement of the loading post base, which is brought into contact with a drum base of the rotating drum when the loading post base is moved to the loading end position;

stopper means, provided within the drum base, for catching said projecting means to stop movement of the loading post base at the loading end position and further comprising a loading arm, provided on a bottom surface of the chassis, said loading arm being coupled to said loading post assembly to move said loading post base along the guide groove, said loading arm having an end portion which is held between a rib of the loading post base and the bottom surface of the chassis, and wherein said loading post base comprises a plurality of guide pins which extend downwardly from a bottom of the loading post base and are separately arranged along a longitudinal line of the loading post base, each of said plurality of guide pins having a rib which laterally extends from a bottom end of each guide pin in a direction opposite to the direction of movement of the loading post base, said end portion of said loading arm being held between the rib of each of the guide pins and the bottom surface of the chassis.

2. The tape loading mechanism according to claim 1, further comprising another loading arm mutually linked with the loading arm, coupled to said loading post assembly, for transmitting a driving force to said loading post assembly to move the loading post base along the guide groove, said loading arm having an opening at one end thereof, said another loading arm being rotatably supported at one end thereof and having a flanged portion at the other end thereof, said flanged portion being fitted into said opening of said loading arm.

3. The tape loading mechanism according to claim 2, wherein said flanged portion of said another loading arm is formed by a burring operation.

* * * * *